(12) United States Patent
Millane (10) Patent No.: US 11,385,055 B2
(45) Date of Patent: Jul. 12, 2022

(54) LASER EMITTER WITH A MODULAR STORAGE UNIT

(71) Applicant: Milwaukee Electric Tool Corporation, Brookfield, WI (US)

(72) Inventor: Christopher R. Millane, Menomonee Falls, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 90 days.

(21) Appl. No.: 16/935,909

(22) Filed: Jul. 22, 2020

(65) Prior Publication Data

US 2021/0025706 A1  Jan. 28, 2021

Related U.S. Application Data

(60) Provisional application No. 62/877,695, filed on Jul. 23, 2019.

(51) Int. Cl.
*G01C 15/00* (2006.01)
*B25H 3/02* (2006.01)

(52) U.S. Cl.
CPC .......... *G01C 15/002* (2013.01); *B25H 3/021* (2013.01)

(58) Field of Classification Search
None
See application file for complete search history.

(56) References Cited

U.S. PATENT DOCUMENTS

| | | | |
|---|---|---|---|
| 3,824,666 A * | 7/1974 | Roodvoets | E04F 21/1838 72/37 |
| 5,144,487 A | 9/1992 | Hersey | |
| 5,218,770 A | 6/1993 | Toga | |
| 5,539,990 A | 7/1996 | Le | |
| 5,572,796 A | 11/1996 | Breda | |
| 5,575,073 A | 11/1996 | von Wedemayer | |
| 5,581,900 A | 12/1996 | Payne | |
| 5,584,458 A | 12/1996 | Rando | |
| 5,680,208 A | 10/1997 | Butler et al. | |
| 5,718,054 A * | 2/1998 | Kitajima | G01B 11/26 33/227 |
| 5,799,404 A | 9/1998 | Payne | |
| 5,819,425 A | 10/1998 | Payne | |
| 5,852,493 A | 12/1998 | Monnin | |
| 5,864,956 A * | 2/1999 | Dong | G01C 15/105 33/227 |

(Continued)

FOREIGN PATENT DOCUMENTS

| | | |
|---|---|---|
| CN | 201057516 | 5/2008 |
| CN | 201885711 | 6/2011 |

(Continued)

OTHER PUBLICATIONS

International Search Report and Written Opinion for International Application No. PCT/US2020/013877, dated May 11, 2020, 10 pages.

*Primary Examiner* — Christopher W Fulton (74) *Attorney, Agent, or Firm* — Reinhart Boerner Van Deuren s.c.

(57) ABSTRACT

Various aspects of a laser level interfacing with a modular storage system are shown. The laser level couples to a storage unit and/or a stand that itself couples to the storage unit. The stand extends past the front of the storage unit and permits the laser level to emit line in the downward direction.

20 Claims, 5 Drawing Sheets

(56) References Cited

U.S. PATENT DOCUMENTS

| | | | |
|---|---|---|---|
| 5,983,510 A * | 11/1999 | Wu | G01C 15/004 33/227 |
| 6,065,217 A | 5/2000 | Dong | |
| 6,167,630 B1 | 1/2001 | Webb | |
| 6,177,987 B1 | 1/2001 | Ting | |
| 6,398,175 B1 | 6/2002 | Conner et al. | |
| 6,438,854 B1 * | 8/2002 | Kott, Jr. | B25B 5/068 269/6 |
| 6,459,483 B1 | 10/2002 | Shafer et al. | |
| 6,487,783 B1 | 12/2002 | Thomas, Jr. | |
| 6,510,615 B1 * | 1/2003 | Budd | G01B 11/26 33/286 |
| 6,532,676 B2 | 11/2003 | Cunningham | |
| 6,735,879 B2 * | 5/2004 | Malard | G01B 11/26 33/286 |
| 6,741,343 B2 | 5/2004 | Shafer et al. | |
| 6,754,969 B2 | 6/2004 | Waibel | |
| 6,792,685 B1 | 9/2004 | Ng et al. | |
| 6,796,040 B2 | 9/2004 | Ohtomo et al. | |
| 6,807,740 B2 * | 10/2004 | Reed | G01C 15/006 33/286 |
| D498,687 S | 11/2004 | Lopano | |
| 6,914,930 B2 | 7/2005 | Raskin et al. | |
| 6,931,739 B2 | 8/2005 | Chang et al. | |
| D509,453 S | 9/2005 | Lopano | |
| 6,941,665 B1 | 9/2005 | Budrow et al. | |
| 6,964,106 B2 | 11/2005 | Sergyeyenko et al. | |
| 7,013,570 B2 | 3/2006 | Levine et al. | |
| D526,587 S | 8/2006 | Lopano | |
| 7,100,293 B2 | 9/2006 | Kahle | |
| 7,134,211 B2 | 11/2006 | Bascom et al. | |
| 7,152,334 B2 | 12/2006 | Gamal et al. | |
| 7,174,648 B2 * | 2/2007 | Long | G01C 15/002 33/286 |
| 7,178,250 B2 * | 2/2007 | Nash | G01C 15/004 33/286 |
| 7,237,341 B2 | 7/2007 | Murray | |
| 7,269,908 B1 | 7/2007 | Murray | |
| 7,310,886 B2 | 12/2007 | Bascom et al. | |
| 7,316,073 B2 | 1/2008 | Murray | |
| 7,359,762 B2 * | 4/2008 | Etter | G05B 19/409 700/160 |
| 7,367,129 B2 * | 5/2008 | Lu | G01C 15/002 33/286 |
| 7,430,810 B2 | 10/2008 | Sergyeyenko et al. | |
| 7,441,981 B2 | 10/2008 | Crain et al. | |
| 7,454,839 B2 | 11/2008 | Della Bona et al. | |
| 7,481,002 B2 | 1/2009 | Bascom et al. | |
| 7,513,051 B2 * | 4/2009 | Spanski | G01C 15/004 33/286 |
| 7,669,816 B2 | 3/2010 | Crain et al. | |
| 7,675,612 B2 | 3/2010 | Kallabis | |
| 7,676,939 B2 | 3/2010 | Scheyer | |
| 7,886,450 B1 * | 2/2011 | Fiano | G01C 15/105 33/286 |
| 8,087,176 B1 | 1/2012 | Hayes et al. | |
| 8,281,495 B2 | 10/2012 | Hayes et al. | |
| 8,307,562 B2 | 11/2012 | Bascom et al. | |
| 8,511,635 B2 | 8/2013 | Steffen | |
| 8,595,946 B2 | 12/2013 | Hayes et al. | |
| 8,640,350 B2 | 2/2014 | Bascom et al. | |
| 8,668,182 B2 | 3/2014 | Steffen et al. | |
| 8,745,884 B2 | 6/2014 | Hayes | |
| 8,943,701 B2 | 2/2015 | Hayes et al. | |
| 9,103,668 B2 * | 8/2015 | Smith | G01C 3/08 |
| 9,303,990 B2 | 4/2016 | Bascom et al. | |
| 9,441,963 B2 * | 9/2016 | Yuen | G01C 9/06 |
| 9,562,766 B2 | 2/2017 | Bascom et al. | |
| 9,846,034 B2 * | 12/2017 | Hill | G01C 15/004 |
| 10,145,676 B2 | 12/2018 | Hayes et al. | |
| 2001/0034944 A1 | 11/2001 | Cunningham | |
| 2002/0186365 A1 | 12/2002 | Shafer et al. | |
| 2003/0014872 A1 * | 1/2003 | Chen | G01C 15/004 33/286 |
| 2003/0123153 A1 | 7/2003 | Ohtomo et al. | |
| 2004/0172836 A1 | 9/2004 | Ng et al. | |
| 2004/0177523 A1 | 9/2004 | Chang et al. | |
| 2004/0255477 A1 | 12/2004 | Levine et al. | |
| 2005/0078303 A1 | 4/2005 | Murray | |
| 2005/0172502 A1 | 8/2005 | Sergyeyenko et al. | |
| 2005/0278966 A1 * | 12/2005 | Liu | G01C 15/004 33/286 |
| 2006/0037205 A1 | 2/2006 | Sergyeyenko et al. | |
| 2006/0037445 A1 | 2/2006 | Sergyeyenko et al. | |
| 2006/0156563 A1 | 7/2006 | Kahle | |
| 2007/0011894 A1 | 1/2007 | Chen | |
| 2007/0056174 A1 | 3/2007 | Bascom et al. | |
| 2007/0079516 A1 * | 4/2007 | Eckstein | G01C 15/004 33/286 |
| 2007/0175054 A1 | 8/2007 | Murray | |
| 2010/0122466 A1 | 5/2010 | Hemingway et al. | |
| 2010/0276554 A1 | 11/2010 | Steffen | |
| 2016/0202056 A1 | 7/2016 | Senger | |
| 2016/0327388 A1 | 11/2016 | Asay | |
| 2017/0166352 A1 | 6/2017 | Hoppe et al. | |
| 2017/0314921 A1 | 11/2017 | Spaulding et al. | |
| 2019/0056215 A1 | 2/2019 | Hayes et al. | |
| 2020/0225034 A1 * | 7/2020 | Gould | G01C 15/004 |

FOREIGN PATENT DOCUMENTS

| | | | |
|---|---|---|---|
| CN | 204807081 | 11/2015 | |
| DE | 202012009216 | 2/2013 | |
| DE | 202017001724 | 6/2017 | |
| EP | 0819911 | 6/2002 | |
| EP | 1843128 | 10/2007 | |
| EP | 1939587 | 7/2008 | |
| EP | 3361215 | 8/2018 | |
| EP | 3214403 | 1/2019 | |
| GB | 2329019 A * | 3/1999 | G01B 11/27 |
| WO | WO9967595 | 12/1999 | |
| WO | WO05024342 | 3/2005 | |
| WO | WO11098608 | 8/2011 | |
| WO | WO15096060 | 7/2015 | |
| WO | WO16037723 | 3/2016 | |
| WO | WO16037724 | 3/2016 | |
| WO | WO-2017093946 A1 * | 6/2017 | G01C 22/00 |
| WO | WO18207185 | 11/2018 | |

\* cited by examiner

LASER EMITTER WITH A MODULAR STORAGE UNIT

CROSS-REFERENCE TO RELATED PATENT APPLICATION

The present application claims the benefit of and priority to 62/877,695, filed on Jul. 23, 2019, which is incorporated herein by reference in its entirety.

BACKGROUND OF THE INVENTION

The present disclosure relates generally to the field of tools. The present disclosure relates specifically to a laser emitter to be used in combination with a modular storage unit.

Laser emitters, such as laser levels and sighting lasers, are commonly used to measure the orientation and position of items and/or features. Modular storage units are detachably coupled to one another. This disclosure relates to a laser emitter that may be coupled to or stored within a modular storage unit.

SUMMARY OF THE INVENTION

One embodiment of the disclosure relates to a modular storage system including a storage unit and a laser level. The storage unit includes a top surface and a plurality of coupling mechanisms located along the top surface. The laser level includes a coupling mechanism that detachably engages with one or more of the plurality of coupling mechanisms of the storage unit. In a specific embodiment the modular storage system also includes a frame coupled to the storage unit, a handle coupled to the frame, and a plurality of wheels rotatably coupled to the frame.

Another embodiment of the disclosure relates to a modular storage system including a laser level, a stand, a storage unit. The stand includes a surface and a first coupling mechanism located along the surface. The first coupling mechanism is configured to detachably engage with the laser level. The storage unit includes a surface and a second plurality of coupling mechanisms located along the surface. One or more of the second plurality of coupling mechanisms are configured to detachably engage with the laser level and the stand. The housing defines a storage compartment sized to receive the laser level and the stand. In a specific embodiment, the housing includes a front surface and the stand comprises a front surface that extends past the front surface of the housing when the stand is coupled to the storage unit.

Another embodiment of the disclosure relates to a modular storage system including a housing defining a storage compartment, a lid pivotably coupled to the housing, the lid including an upper surface and an opposing lower surface, a plurality of coupling mechanisms located along the upper surface of the lid, and a laser target located on the lower surface of the lid. The laser target is configured to emit a return light in response to a beam of laser light received from a laser level. Aspects of the return light vary in relation to (e.g., based on) a distance that the received beam of laser light is from a center of the laser target.

In one embodiment, the disclosure described herein relates to a laser emitter, such as a laser level, that is configured to be used with modular storage units. In one embodiment, a laser level housing includes a laser emitter. The housing couples to a modular storage unit via a modular coupling mechanism. Alternatively, the laser level couples to a stand, which itself couples to the modular storage unit. The stand laterally offsets the laser level housing with respect to the modular storage unit, allowing an emitted laser to project on a surface beneath the laser level housing (e.g., the ground).

In a specific embodiment, the laser level housing couples to the modular storage unit via an interface compatible with the coupling mechanism(s) described in International Patent Application No. PCT/US2018/044629.

Additional features and advantages will be set forth in the detailed description that follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a laser emitter, shown as a laser level, are shown. Various embodiments of the laser level discussed herein are configured to be coupled to a modular storage unit.

As will generally be understood, a laser level is used to align objects or features in an area (e.g., such as holes along a wall, pipe, conduit, etc.). Providing cooperating coupling mechanism on the laser level and on a storage unit, such as a mobile module storage unit, provides the ability to quickly mount and use the laser level in an area that may not otherwise have a convenient laser level mounting or support locations (e.g., rooms with finished surfaces that should not be marred or drilled, rooms without walls, outdoors).

In various embodiments, the laser level described herein is configured to be coupled to and/or supported from a modular storage unit during use of the laser level. In one embodiment, the laser level is coupled to a stand, and the stand is coupled to a modular storage unit. The laser level is laterally offset from the modular storage unit by the stand. The lateral offset allows the laser level to project a point or line beneath the laser level, thereby allowing the user to align the laser level with a reference point on the floor (e.g., a spray-painted mark).

Figure 1:
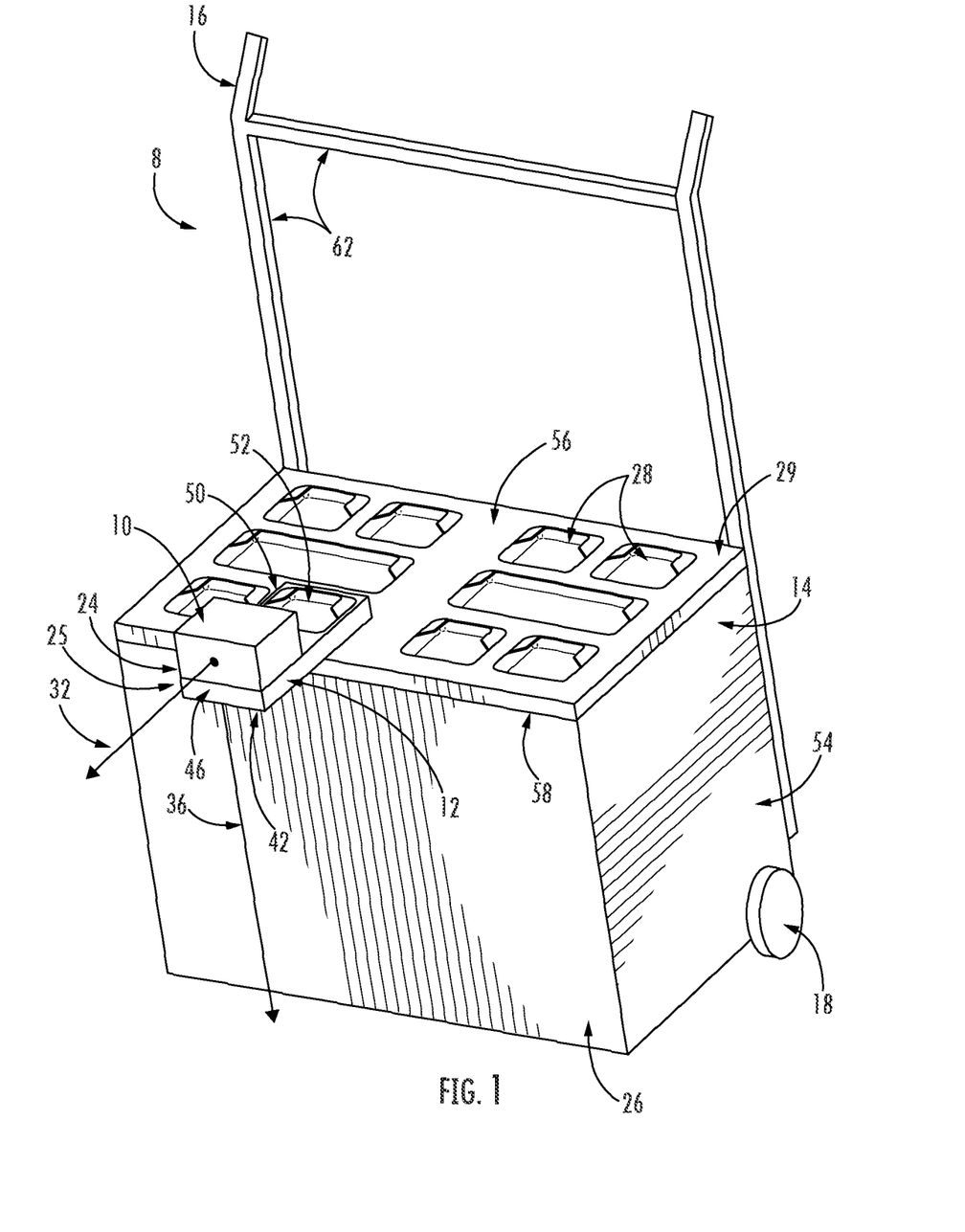
FIG. 1 is a perspective view of a modular storage system with a laser level, according to an exemplary embodiment.
Figure 2:
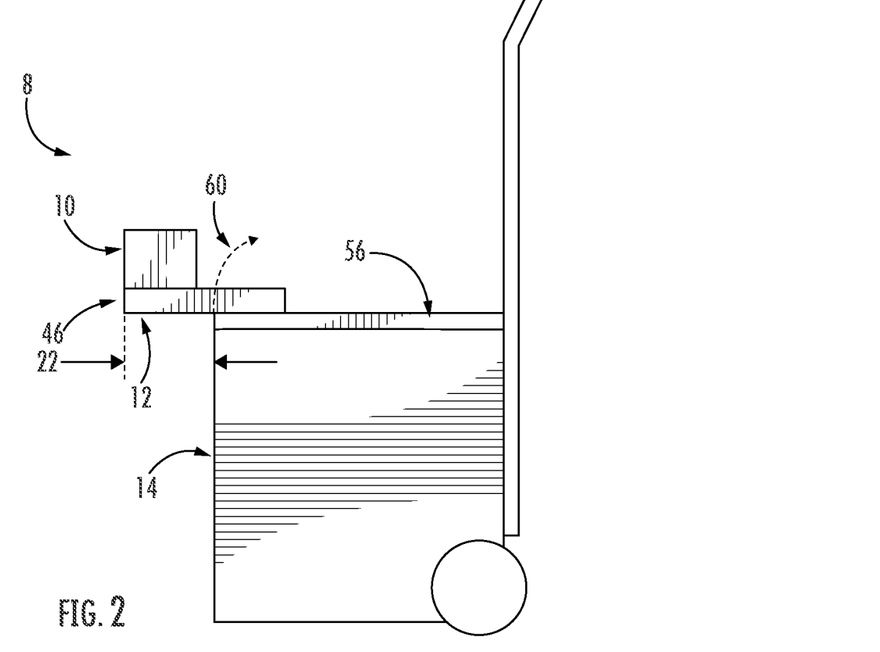
FIG. 2 is a side view of the modular storage system of FIG. 1, according to an exemplary embodiment.

Referring to FIGS. 1-2, an exemplary storage system, shown as modular storage system 8, is shown. Modular storage system 8 includes a laser emitter, shown as laser level 10, which is coupled to a stand, shown as modular stand 12.

When laser level 10 is coupled to modular stand 12, which is coupled to storage unit 14, modular stand 12 includes an adjustable offset 22 that allows laser level 10 to extend, at least partially, off of the top surface 29 of a storage unit, shown as movable modular storage unit 14. In this configuration, front surface 46 of modular stand 12 extends past a front surface 26 of housing 54 of storage unit 14. This offset 22 allows laser level 10 to project a light, shown as light 36, to show a point or line on the ground below laser level 10, thereby allowing the user to align the laser level 10 with a reference point on the floor (e.g., a spray-painted mark). In this position, laser level 10 can emit light 36 downward (e.g., parallel to force gravity in the downward direction) in front of front surface 26 of housing 54. Laser level 10 also emits light 32 in a forward direction (e.g., parallel to the ground).

Laser level 10 detachably engages with modular stand 12, and modular stand 12 detachably engages with storage unit 14. Movable modular storage unit 14 can be moved by a user via handle 16, frame 62 and wheels 18 that permit rolling movable modular storage unit 14 to desired locations.

Figure 3:
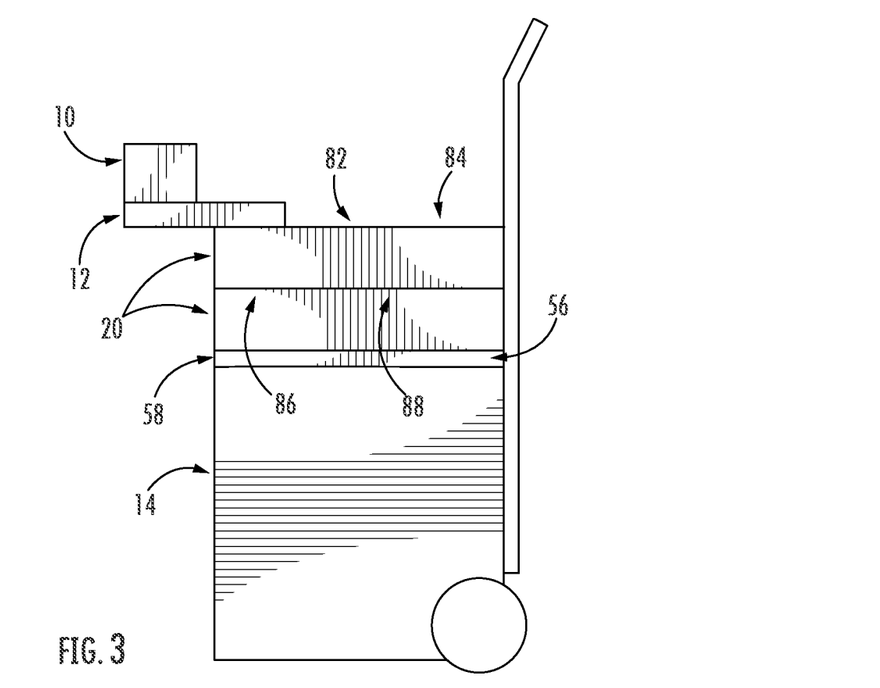
FIG. 3 is a side view of the modular storage system of FIG. 1 with two additional storage units, according to an exemplary embodiment.
Figure 4:
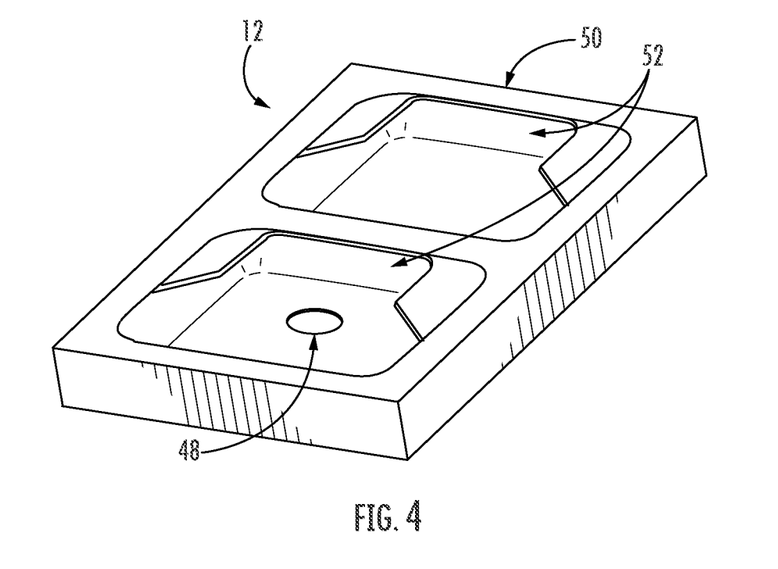
FIG. 4 is a perspective view from above of the laser level stand of FIG. 1, according to an exemplary embodiment.
Figure 5:
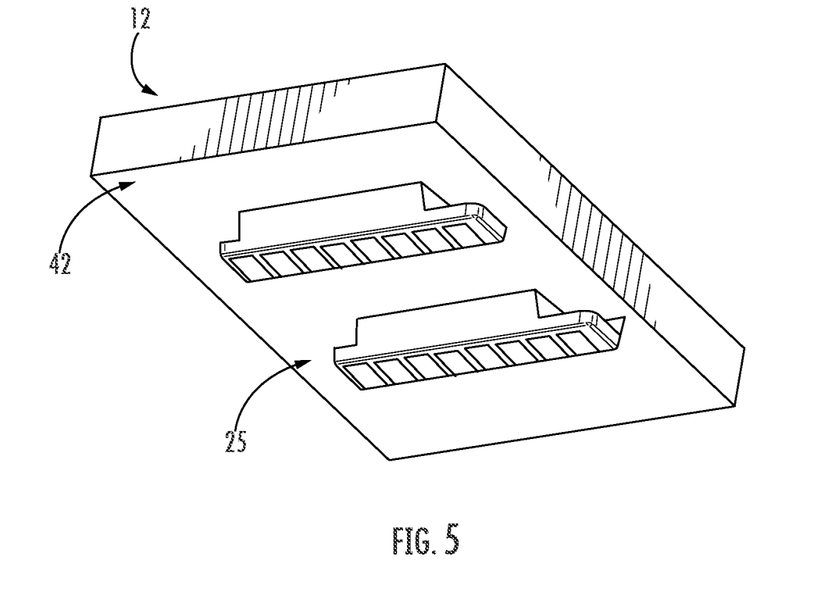
FIG. 5 is a perspective view from below of the laser level stand of FIG. 1, according to an exemplary embodiment.
Figure 6:
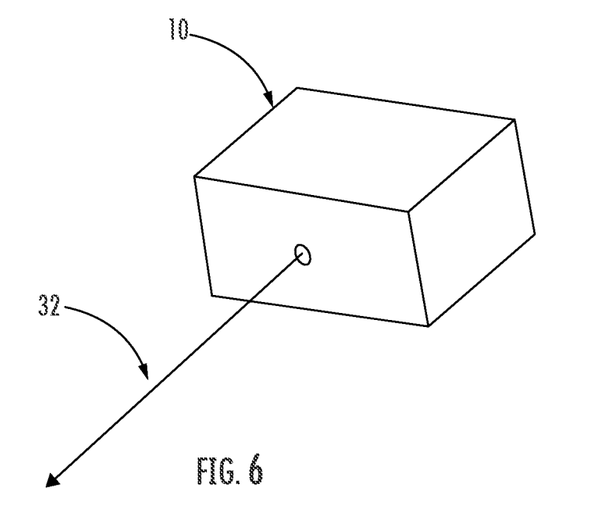
FIG. 6 is a perspective view from above of the laser level of FIG. 1, according to an exemplary embodiment.
Figure 7:
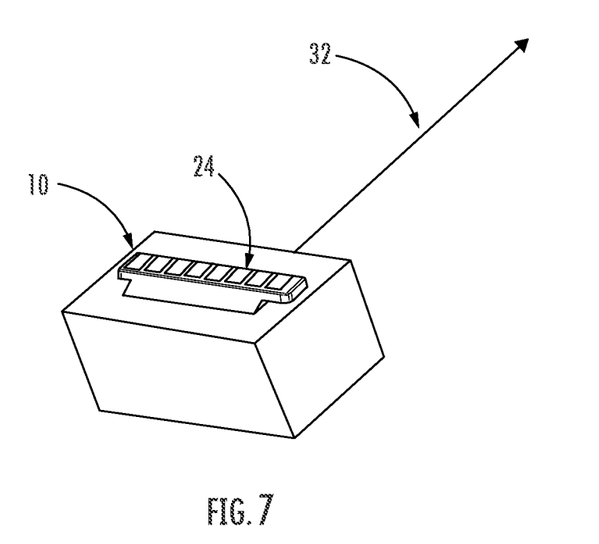
FIG. 7 is a perspective view from below of the laser level of FIG. 1, according to an exemplary embodiment.

Turning to FIGS. 2-3, storage unit 14 includes top panel 56, which is pivotably coupled to housing 54 of storage unit 14 such that front surface 58 of top panel 56 rotates in direction 60 away from front surface 26 of housing 54. Turning to FIG. 3 in particular, a storage device, shown as lower supplemental storage unit 20, detachably engages with storage unit 14, and another storage device, shown as upper supplemental storage unit 20, detachably engages with lower supplemental storage unit 20. In a specific embodiment, supplemental storage units 20 include an upper surface 82, along which one or more coupling mechanisms 84 are located, and a lower surface 86, along which one or more coupling mechanisms 88 are located. As shown in FIGS. 2 and 3, laser level 10 and modular stand 12 can be coupled to a top surface of storage unit 14 or to upper-most supplemental storage unit 20.

It is contemplated herein that coupling mechanisms 24, 28, 25, 52, 84 and 88 are configured to interface with one or more of the coupling mechanisms described in International Patent Application No. PCT/US2018/044629.

Turning to FIGS. 4-7, various aspects of modular stand 12 and laser level 10 are shown. Modular stand 12 includes upper surface 50, along which one or more coupling mechanisms 52 are located, and an opposing lower surface 42, along which one or more coupling mechanisms 25 are located. Lower surface 42 of modular stand 12 includes coupling mechanism 25, which detachably engages with coupling mechanism 28 located along top surface 29 of movable modular storage unit 14. Modular stand 12 defines an aperture 48, through which laser level 10 can project downward light 32.

Laser level 10 includes coupling mechanism 24, which detachably engages with the one or more coupling mechanism 52 located along upper surface 50 of modular stand 12. Coupling mechanism 24 of laser level 10 detachably couples with one of coupling mechanisms 52 of modular stand 12.

Figure 8:
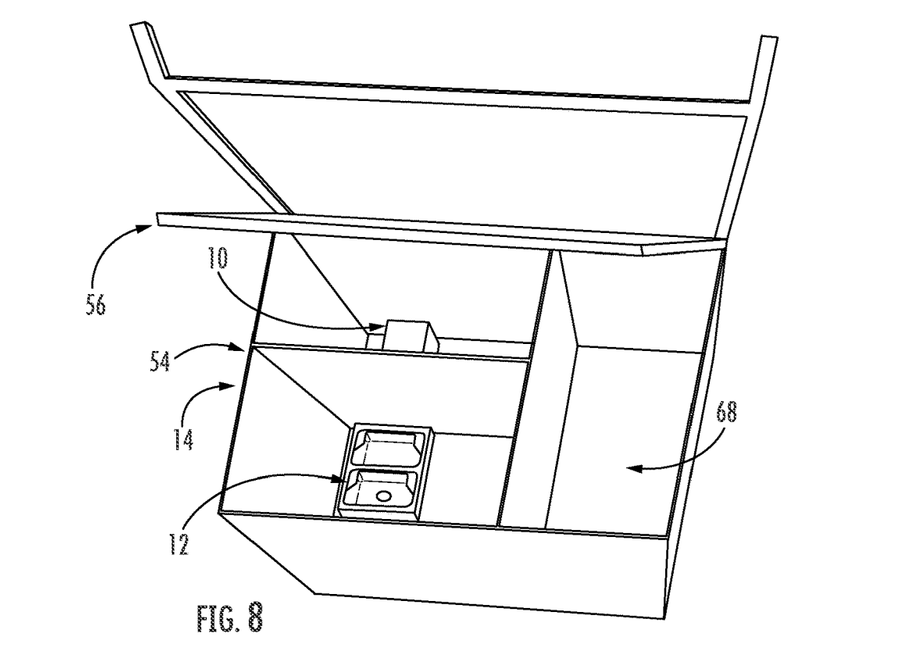
FIG. 8 is a perspective view of the storage unit of FIG. 1 with a lid in an open position, according to an exemplary embodiment.

Turning to FIG. 8, storage unit 14 defines storage compartment 68. In a specific embodiment, storage compartment 68 is sized to receive one or more of modular stand 12 and laser level 10. Top panel 56 may be pivotably opened with respect to housing 54 of storage unit 14 to allow access to storage compartment 68.

Figure 9:
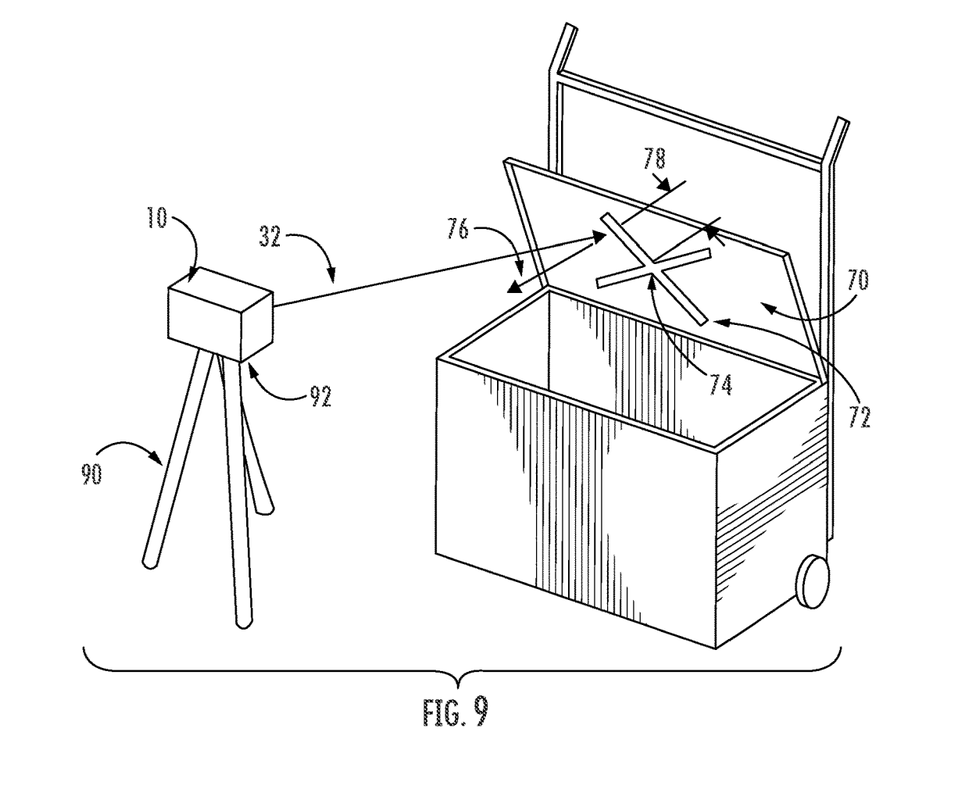
FIG. 9 is a perspective view of the storage unit of FIG. 1 with a laser level coupled to an adjustable stand, according to an exemplary embodiment.

Turning to FIG. 9, in a specific embodiment top panel 56 of storage unit 14 defines a lower surface 70, along which laser target 72 is located. When top panel 56 is opened, laser target 72 is visible. Laser target 72 is configured to receive light 32 from laser level 10, and return light 76 is emitted by laser target 72, such as by a reflection of light 32. Return light 76 varies as a result of distance 78 that light 32 intersects lower surface 70 from center 74 of laser target 72. For example, when light 32 intersects with laser target 72 furthest from center 74, return light 76 includes beams of light from two legs of laser target 72 that are distance 78 from center 74. Continuing the example, when light 32 intersects with center 74 of laser target 72, return signal includes a single beam of light originating from center 74. The varying return light 76 resulting from where light 32 intersects laser target 72 provides the user an indication of how to adjust laser level 10 and/or storage unit 14 so that light 32 is aligned with center 74.

In an alternate embodiment, return light 76 is generated via light pipes redirecting light 32 to be emitted from laser target 72 towards a user.

Laser level 10 is shown coupled to a platform to support laser level 10, shown as an adjustable platform, shown as tripod 90, which includes coupling mechanism 92. Coupling mechanism 92 of tripod 90 engages with coupling mechanism 24 of laser level 10.

In various embodiments, a storage box is configured to be coupled to a modular storage unit. In various embodiments, the storage box includes laser level 10, a laser target, a laser detector, a battery, a charger and/or an adjustable stand for laser level 10 and/or the laser target.

In various embodiments, the top lid of the movable modular storage unit 14 and/or supplemental storage unit 20 includes features that allows the inside lid to be used as a laser target (e.g., laser target 72). For example, reflective tape, light pipes, or other features that enhance the visibility of an emitted light (e.g., a laser dot, a laser line) are included on the lid (e.g., on an inside surface of the lid).

In a specific embodiment, the laser level 10 includes a self-leveling laser level that emits a leveled line or point independent of the orientation of the laser level 10 (e.g., at a predetermined angle relative to gravity).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A modular storage system comprising:
   a storage unit comprising:
      a top surface; and
      a plurality of coupling mechanisms located along the top surface; and
   a laser level comprising a coupling mechanism that detachably engages with one or more of the plurality of coupling mechanisms of the storage unit.

2. The modular storage system of claim 1, further comprising:
   a stand comprising:
      a bottom surface; and
      a stand coupling mechanism located along the bottom surface, the stand coupling mechanism detachably engages with at least one of the plurality of coupling mechanisms of the storage unit;
   wherein the stand is coupled to the storage unit via engagement of the stand coupling mechanism with the at least one of the plurality of coupling mechanisms of the storage unit and the laser level is detachably coupled to the storage unit via being directly detachably coupled to the stand.

3. The modular storage system of claim 2, the storage unit comprises a front surface, and the stand comprises a front surface that extends past the front surface of the storage unit.

4. The modular storage system of claim 3, wherein the storage unit comprises:
   a housing defining the front surface of the storage unit; and
   a top panel pivotably coupled to the housing, the top panel comprising a front surface, wherein the front surface of the top panel pivotably rotates away from the front surface of the housing as the top panel moves from a closed position to an open position.

5. The modular storage system of claim 3, wherein the laser level projects a light downward in front of the front surface of the storage unit when the laser level is coupled to the stand and the stand is coupled to the storage unit.

6. The modular storage system of claim 3, wherein the laser level projects a light downward through an aperture in the stand.

7. The modular storage system of claim 1, the modular storage system further comprising:
   a frame coupled to the storage unit;
   a handle coupled to the frame; and
   a plurality of wheels rotatably coupled to the frame.

8. The modular storage system of claim 1, wherein the storage unit is a first storage unit, the modular storage system further comprising:
   a second storage unit comprising:
      an upper surface and an opposing lower surface;
      a first plurality of coupling mechanisms located along the upper surface of the second storage unit; and
      a second plurality of coupling mechanisms located along the lower surface of the second storage unit;
   wherein the second storage unit is coupled to the top surface of the first storage unit via the first plurality of coupling mechanisms of the second storage unit detachably engaging with the plurality of coupling mechanisms of the top surface of the first storage unit.

9. A modular storage system comprising:
   a laser level;
   a stand comprising:
      a surface; and
      a first coupling mechanism located along the surface, the first coupling mechanism configured to detachably engage with the laser level; and
   a storage unit comprising:
      a surface;
      a second plurality of coupling mechanisms located along the surface, one or more of the second plurality of coupling mechanisms configured to detachably engage with the laser level and the stand; and
      a housing defining a storage compartment sized to receive the laser level and the stand.

10. The modular storage system of claim 9, wherein the laser level is a self-leveling laser that emits light at a predetermined angle relative to gravity.

11. The modular storage system of claim 9, the housing comprises a front surface, and the stand comprises a front surface that extends past the front surface of the housing when the stand is coupled to the storage unit.

12. The modular storage system of claim 11, the storage unit comprising:
   a top panel pivotably coupled to the housing, the top panel comprising a front surface, wherein the front surface of the top panel pivotably rotates away from the front surface of the housing.

13. The modular storage system of claim 9, wherein the laser level projects a light downward in front of the front surface of the storage unit when the laser level is coupled to the stand and the stand is coupled to the storage unit.

14. The modular storage system of claim 9, wherein the laser level projects a light downward through an aperture in the stand.

15. The modular storage system of claim 9, further comprising:
   an adjustable platform comprising a third coupling mechanism that detachably engages with the laser level, wherein the storage compartment is sized to receive the adjustable platform.

16. The modular storage system of claim 9, wherein the storage unit is a first storage unit, the modular storage system further comprising:
- a second storage unit comprising:
  - an upper surface and an opposing lower surface;
  - a third plurality of coupling mechanisms located along the upper surface of the second storage unit; and
  - a fourth plurality of coupling mechanisms located along the lower surface of the second storage unit;
- wherein the second storage unit is coupled to the upper surface of the first storage unit via the fourth plurality of coupling mechanisms of the second storage unit detachably engaging with the second plurality of coupling mechanisms of the first storage unit.

17. A modular storage system comprising:
- a housing defining a storage compartment;
- a lid pivotably coupled to the housing, the lid comprising an upper surface and an opposing lower surface;
- a plurality of coupling mechanisms located along the upper surface of the lid; and
- a laser target located on the lower surface of the lid, the laser target configured to emit a return light in response to a received beam of laser light from a laser level, wherein the return light varies based on a distance that the received beam of laser light is from a center of the laser target.

18. The modular storage system of claim 17, wherein the laser level comprises a second coupling mechanism that detachably engages with one or more of the plurality of coupling mechanisms located along the upper surface of the lid.

19. The modular storage system of claim 17 further comprising:
- a laser level comprising a second coupling mechanism that detachably engages with one or more of the plurality of coupling mechanisms located along the upper surface of the lid; and
- an adjustable stand comprising a third coupling mechanism that detachably engages with the second coupling mechanism of the laser level.

20. The modular storage system of claim 17 further comprising:
- a frame coupled to the storage unit;
- a handle coupled to the frame; and
- a plurality of wheels rotatably coupled to the frame.

* * * * *